Aug. 25, 1953 M. GOLAND ET AL 2,650,057
AUTOMATIC MEASURING APPARATUS AND METHOD
Filed Sept. 4, 1947 3 Sheets-Sheet 1

Inventors
MARTIN GOLAND
PRICE D. WICKERSHAM
By The Firm of Charles W. Hills
Attys.

Aug. 25, 1953  M. GOLAND ET AL  2,650,057
AUTOMATIC MEASURING APPARATUS AND METHOD
Filed Sept. 4, 1947  3 Sheets-Sheet 2

Inventors
MARTIN GOLAND
PRICE D. WICKERSHAM
by The Firm of Charles Hills  Attys.

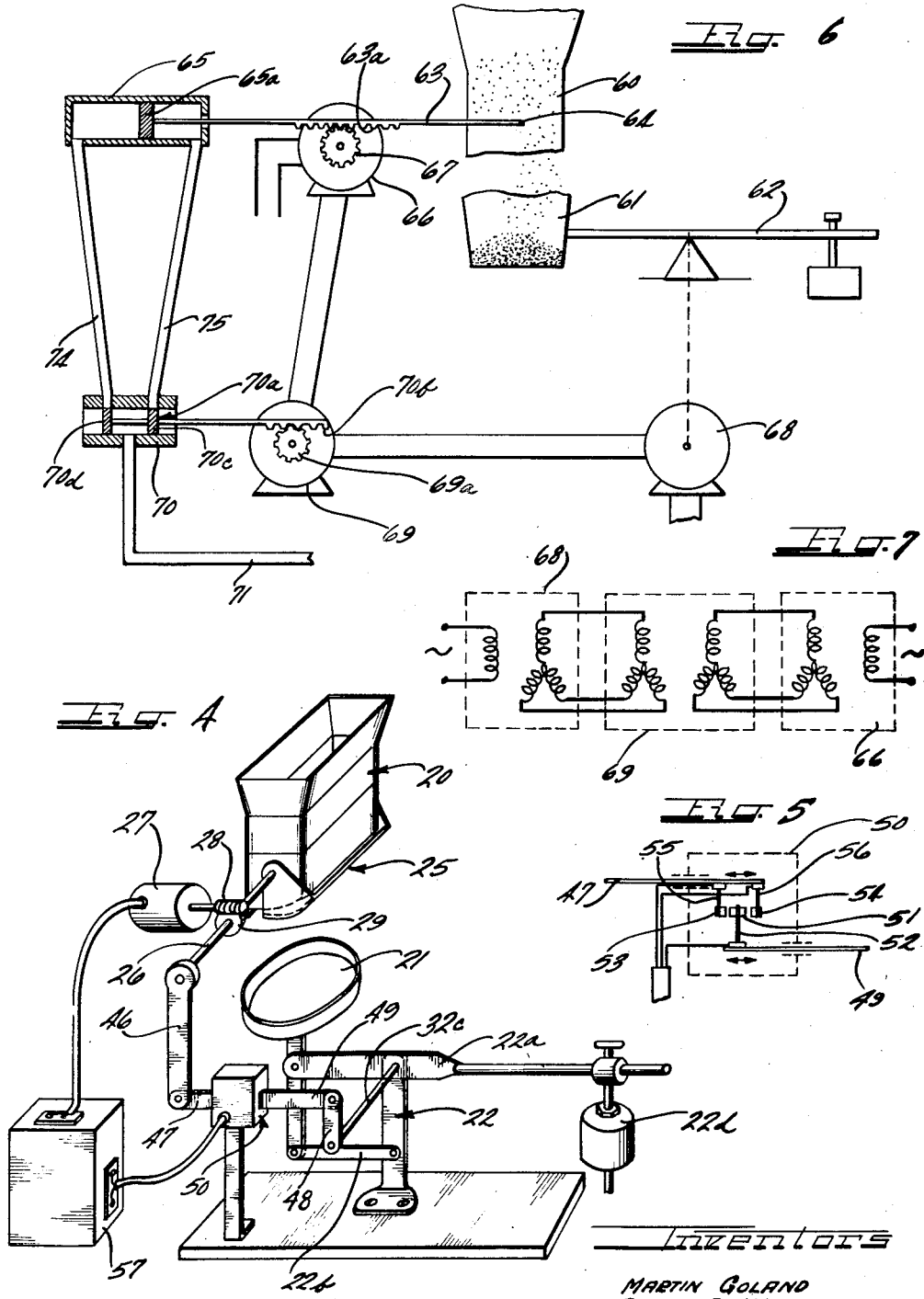

Patented Aug. 25, 1953

2,650,057

UNITED STATES PATENT OFFICE 2,650,057

AUTOMATIC MEASURING APPARATUS AND METHOD

Martin Goland and Price D. Wickersham, Kansas City, Mo., assignors to Midwest Research Institute, Kansas City, Mo., a corporation of Missouri Application September 4, 1947, Serial No. 772,059

12 Claims. (Cl. 249—1)

This invention relates to the automatic measurement of successive quantities of flowable material, and particularly to an improved method and apparatus for automatic batch weighing or automatic batching according to volume.

Many measuring devices have heretofore been developed for automatically effecting the separation of identical, successive quantities of a separable material from a large mass or source of supply of such material. Such devices have been particularly valuable in the packaging of granular materials for merchandising purposes whereby successive containers are filled with the proper weight or volume of the particular material.

The majority of devices now in use for automatic batch weighing, or automatic batching according to volume, operate on the principle of rapidly closing or triggering a spring loaded gate attached to a supply hopper when a predetermined weight or volume is attained in the measuring pan of the weight or volume measuring scale. In the case of weighing operations, the conventional system comprises a feed hopper whose output is controlled by a gate, and a scale, ordinarily of the balance beam type, upon which is a pan to receive the material passed by the gate. During the loading period, the hopper gate is full open and a maximum rate of flow of the material to the weighing pan is obtained. When the weight or volume of material loaded on the scale reaches a pre-set value, a trigger is engaged which causes the supply gate to snap shut. For volume batching the scheme of operations is generally the same, the weight sensitive scale being replaced by a volume sensitive device.

It has been generally recognized that systems utilizing this principle of operation are inherently inaccurate due to the "standing column" error, i. e., since the gate cannot be closed instantly, but only within a finite time, a quantity of material pours from the supply hopper to the scale, or other container, during the closing operation, and this flow is not under the direct control of the mechanism. Even should an instantaneous closing of the gate be achieved, a certain "standing column" error is present, for, at the instant of closing, a quantity of material is suspended between the gate and the container. If other design parameters are left unchanged, the "standing column" error becomes greater as the time for the measurement cycle is reduced, since with more rapid cycling the rates of flow during the closing operation are larger.

A second and obviously less important source of error in the weighing systems of the type now in use arises as a result of the impact forces of the falling material striking the scale. Impact forces of this kind will cause premature triggering of the gate. A similar error may enter into volume measurements due to the turbulence induced by the falling material entering the container.

In order to reduce these errors to a minimum, it has been the practice to trigger the gate somewhat prematurely, so that when the material contained in the standing column is added to that directly measured, the desired final weight, or volume, is achieved. It is evident that this type of error compensation is satisfactory only if the operating conditions remain strictly the same during each batching. In many weighing operations, the density of the material being batched changes substantially and unpredictably; therefore, the weight of material involved in the standing column then changes, causing an error to appear in the final measurement. Changes in viscosity, and so forth, will similarly cause errors to appear in volume measuring systems. Errors from causes such as these are encountered frequently in commercial batching operations, necessitating constant vigilance on the part of the operating personnel for their prevention.

Another procedure occasionally employed to reduce the magnitude of the "standing column" and other errors is the dribble feed technique: at some pre-set weight, or volume below the desired final value, the supply hopper gate is moved from the full open to a slightly open position so that the rate of flow of the material into the measuring container is substantially reduced. Then when the desired weight or volume is reached, the gate is triggered shut. While this method does not remove the errors in question from the system, it is evident that their magnitudes are reduced. However, the dribble feed systems are subject to the serious disadvantage of substantially slowing up the measurement cycle in which they are employed.

In accordance with this invention, a method of batch measuring is provided wherein the quantity of material already delivered to the measuring device, be it by weight or volume, is related at each instance to the position of the hopper gate controlling the flow of the material to the measuring device. The relationship is such that the hopper gate is gradually closed as the desired weight or volume of material is approached on the material-receiving pan of the measuring device. When the desired measurement has been attained, the gate is completely closed concurrently therewith and there is no "standing column" in existence to produce the errors which have characterized the heretofore utilized systems.

Accordingly, it is an object of this invention to provide an improved method and apparatus for batch measuring of flowable material.

Another object of this invention is to provide an improved method for batch measurement which permits successive measurements to be automatically accomplished in less time per cycle and with greater accuracy than methods heretofore employed.

Still another object of this invention is to provide an improved batch measuring apparatus characterized by the simplicity of its construction, economy of manufacture, and unusual reliability and accuracy of its performance in automatically separating batches of flowable, separable material according to either weight or volume standards.

A particular object of this invention is to provide an improved batch measurement measuring method and apparatus including an adjustably positionable gate controlling the flow of material to the measuring pan of a measuring device and characterized by the generation of a first signal as a function of the amount of material received by the pan of the measuring device and generation of a second signal which is a function of the position of the gate controlling the flow of material to the measuring pan, and continuously comparing such two signals to obtain an error signal which is utilized to modify the position of the gate in a direction to reduce the error signal to zero.

Accordingly, as a further object, this invention provides a batch measurement technique wherein no standing column is in existence at the moment that the material on the measuring pan of the measuring device arrives at the chosen predetermined value of weight or volume.

The specific nature of the invention, as well as other objects and advantages thereof, will become apparent to those skilled in the art from the following detailed description of the annexed sheets of drawings which, by way of preferred example only, illustrate three specific embodiments of the invention.

On the drawings:

Figure 4 is a schematic perspective view of a second modification of this invention showing a weighing apparatus wherein mechanical movements are utilized as signals to respectively indicate the position of the gate controlling the flow of material and the amount of material received by the measuring pan of the weighing scale;

Figure 5 is a schematic view illustrating the construction of the differential unit employed in the modification of Figure 4 for the production of an error signal;

Figure 6 is a schematic view of a measuring apparatus representing a third modification of this invention wherein the positioning of the gate controlling the flow of material onto the pan of the weighing scale is controlled by a fluid pressure mechanism; and Figure 7 is a circuit diagram illustrating the electrical circuit connection employed in the modification of Figure 6.

As shown on the drawings:

Figure 1:
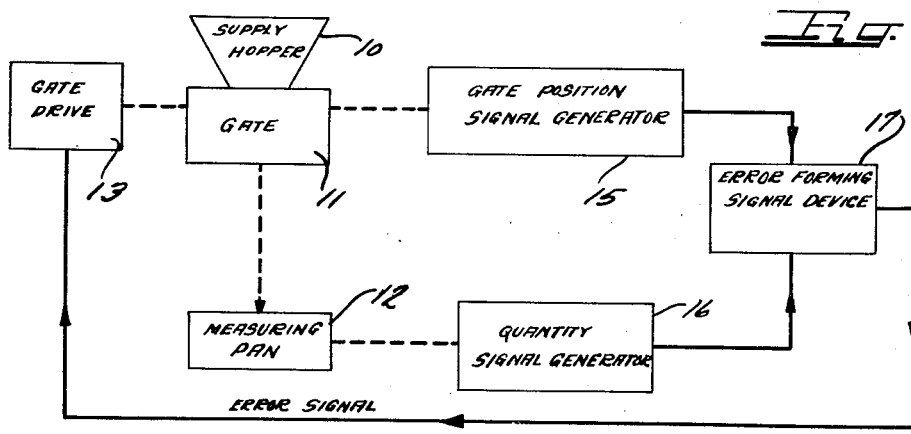
Figure 1 is a block diagram of the fundamental servo system employed in carrying out the method of this invention.

Referring now to the block diagram of Figure 1, the improved method of batch measurement effected in accordance with this invention will be readily apparent. Thus, the material to be batched, whether by volume or by weight, is shifted from a supply hopper 10 through a flow controlling gate or valve 11 onto the measuring tray or pan 12 of a weight or volume measuring device. Movement of the material from the supply hopper 10 to the measuring device 12 may obviously be accomplished in a variety of conventional manners, for example, by gravity flow or by a force feed arrangement.

The position of the gate 11 controlling the rate of flow of material to the measuring device 12 is controlled by a gate driving mechanism 13 which may be either electrically or fluid operated. A signal generator 15 is provided which generates a signal which is a function of the position of the hopper gate 11. Likewise, a signal generator 16 is provided which produces a signal generally similar to that produced by signal generator 15 but which is a function of the quantity of material transferred to the measuring device 12. The two signals respectively produced by signal generators 15 and 16 are compared in an error forming device 17. To effect such comparison, a desired correspondence between the instantaneous weight or volume of material in the scale pan and the instantaneous gate position is selected, and so long as the position of the hopper gate and the amount of material on the scale pan conform to such schedule, then no output signal is produced by the error forming device 17. However, whenever this correspondence is violated during a weighing operation, an error signal is produced whose magnitude and direction indicates the relative deviation of the signals respectively produced by the generators 15 and 16 from the predetermined schedule. Such error signal is then employed to control the gate drive mechanism 13, the control being applied in such manner as to operate the gate drive to tend to reduce the error signal to a zero value. It is therefore apparent that an improved servo-controlled, batch measuring system has been provided.

It is believed obvious that the most desirable schedule relating the instantaneous scale weight or volume to the desired instantaneous gate position should be such as to gradually close the gate as the desired final quantity, be it weight or volume, is approached.

It is also important to note that the described method may be employed with signal generators of any type, i. e., the signals generated by the scale and gate can be electrical, mechanical, or fluid pressure character; furthermore, the error signal can also appear in any of these forms, and no restriction is placed on the type of drive which opens and closes the gate.

It is apparent that the operation of the gate drive can follow various well known patterns. Thus, a "modulating" system can be employed, in which the corrective torque or force applied to the hopper gate is at any instant dependent upon the algebraic magnitude of the "error signal," or on some combination of the error signal and its mathematical derivatives and integrals. An alternative to this system is an "on-off" type drive; in this, the direction of the correction torque is determined by the direction of the "error signal," the magnitude of the torque otherwise remaining essentially constant. For a zero signal, no corrective torque is applied.

To illustrate the diversity of application of the methods of this invention, there will be now described three distinct forms of apparatus for applying the principles of this invention to automatic batch weighing of granular material. It should be distinctly understood, however, that the principles of this invention are equally applicable to the effecting of batching by volume measurements and are in no manner limited to granular materials, but are equally applicable to any material having the properties of separability and flowability.

Figure 2:
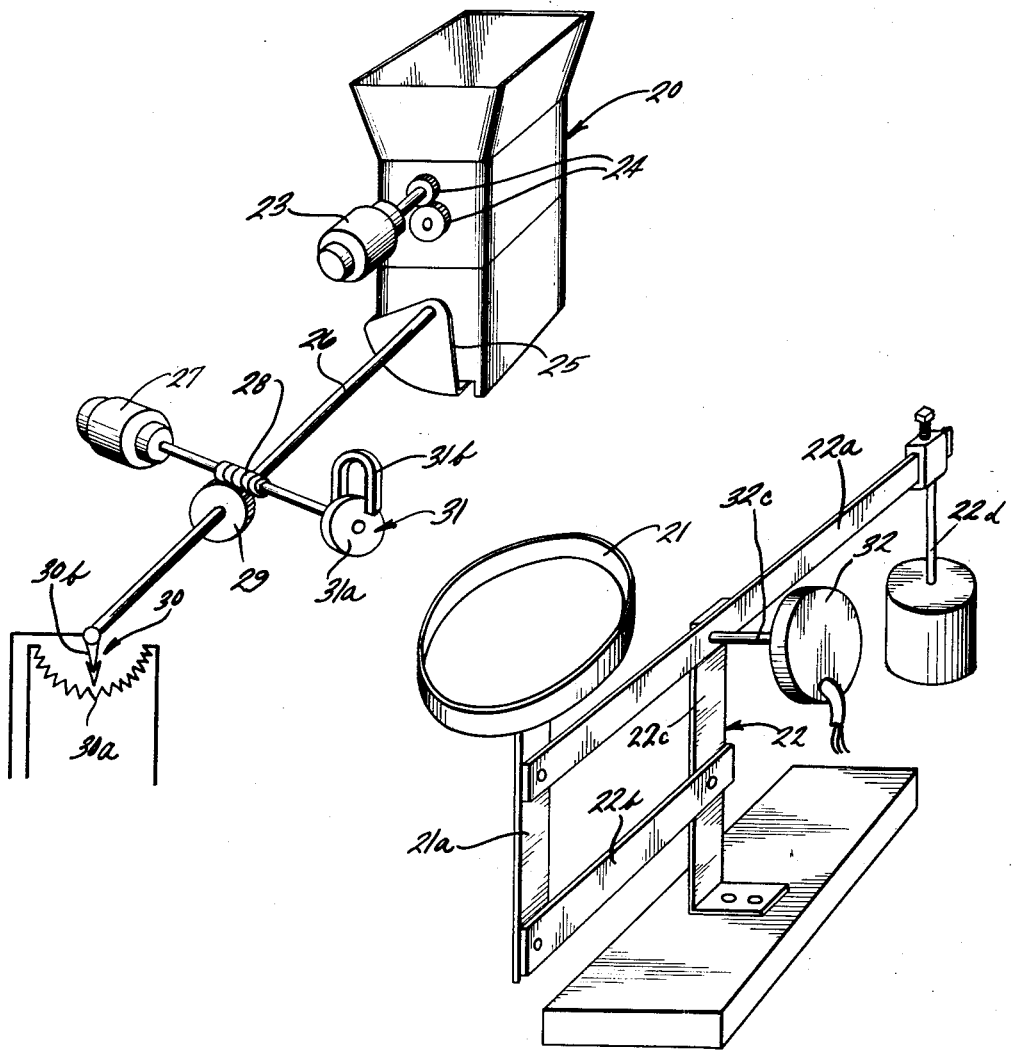
Figure 2 is a schematic perspective view of an apparatus representing one modification of the invention wherein electrically generated signals are employed to effect a correlation of the position of the hopper gate with the amount of material received upon the measuring pan of the scale.

Referring to Figure 2, there is disclosed a hopper 20 of conventional configuration which is arranged to supply materials to be weighed to the pan 21 of a balance beam type scale 22. If desired, any conventional form of force feed of the material through the hopper 20 may be employed, such as a rotating star wheel (not shown) driven by a feed motor 23 through suitable gearing 24.

A pivoted valve or gate 25 is provided in cooperative relation with the bottom open mouth of hopper 20 so that the pivotal position of gate 25 determines the rate of flow of material from the hopper 20 onto the scale pan 21. The pivotal position of gate 25 is controlled by a shaft 26 which is driven by a gate drive motor 27 through worm 28 and worm gear 29. In addition, the shaft 26 drives an electrical signal generating device 30 which produces an electrical signal proportional to the rotational position of shaft 26, hence to the position of the valve or gate 25. Signal generator 30 may, for example comprise a potentiometer 30a having a movable tap 30b connected to and driven by the shaft 26.

If desired, a brake or damping unit 31 may be applied to the motor 27 to facilitate the speed of stopping and reversal of motor 27. Brake unit 31 may conveniently comprise a conducting disk 31a which cooperates with a permanent magnet in well known fashion.

The balance beam scale 22 may comprise any of the several well known forms having a medially pivoted balance beam 22a supporting at one end a link 21a upon which the measuring tray or pan 21 is secured. A leveling link 22b is then pivotally secured between the bottom of tray support link 21a and an intermediate portion of the central support post 22c. A counterweight 22d is adjustably positionable upon the other arm of balance beam 22a.

An electrical signal generator 32 is provided to produce an electrical signal proportional to the deflection of balance beam 22a, hence proportional to the amount of material collected on tray 21. Signal generator 32 may, if desired, also comprise a potentiometer arrangement similar to the signal generator 30 wherein the movable tap 32b of the potentiometer 32a (Figure 3) is shifted by a shaft 32c which is connected to rotate with balance beam 22a about the pivotal point of the balance beam.

Figure 3:
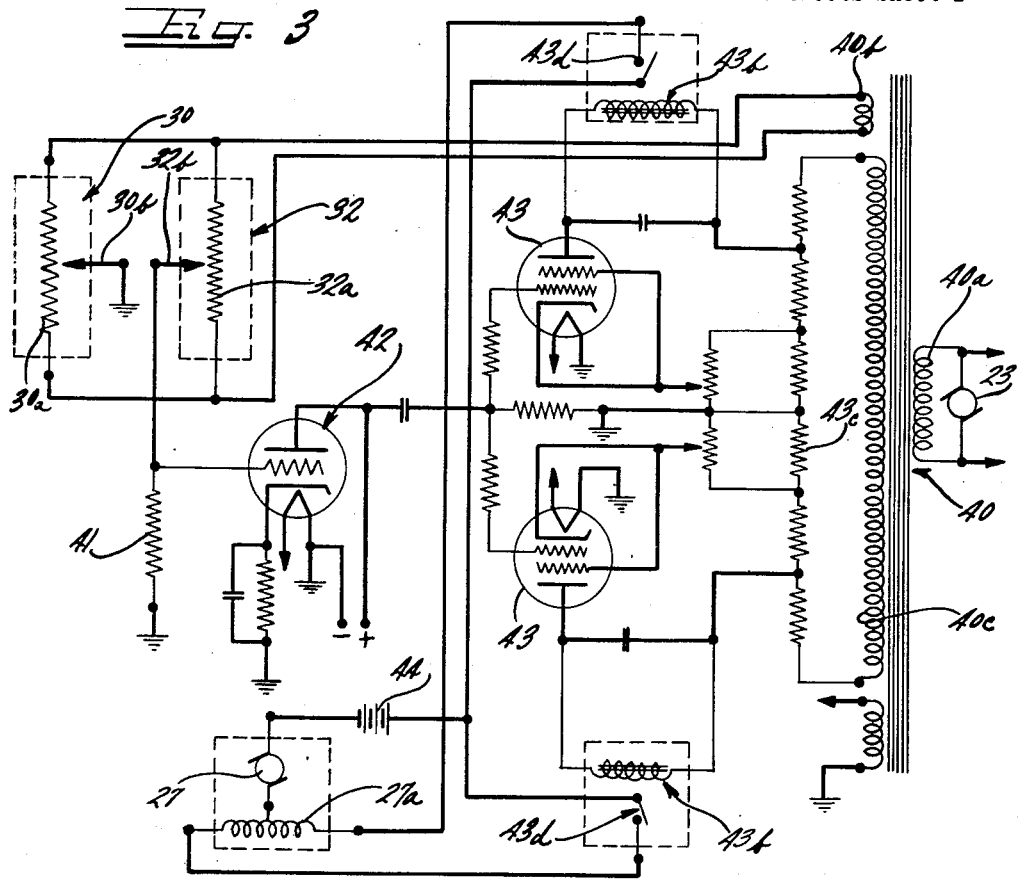
Figure 3 is a circuit diagram of a preferred form of control circuit employed in connection with the modification of Figure 2.

Pursuant to the methods of this invention, the electrical signals resulting from the signal generators 30 and 32 are compared to produce an error signal and such error signal utilized to control the gate drive motor 27 by utilization of the circuit arrangement set forth in Figure 3.

A power transformer 40 is provided having a primary winding 40a connected across a suitable source of alternating current. The feed motor 23 may also be directly connected across such source.

Transformer 40 has a relatively low voltage secondary winding 40b which is applied across the parallel connected terminals of the signal generators 30 and 32. The movable tap of one of the signal generators is grounded while the movable tap of the other generator is connected to ground across a fixed resistance 41. Now if a schedule of correspondence between the positions of the gate 25 and the amount of material on pan 21 is selected so that the movable taps of the signal generators 30 and 32 should remain in the same relative position with respect to their potentiometer resistances, it is apparent that so long as such correspondence is maintained, no voltage will appear across the resistor 41 to ground. However, when either the gate 25 or the amount of material on pan 21 departs from the scheduled correspondence, then the relative movement of the taps 30b and 32b with respect to the potentiometer resistances 30a and 32a will be unequal and a voltage or "error signal" will be produced across the resistor 41. Not only will the magnitude of this error signal voltage be proportional to the extent of departure of the position of gate 25 or the amount of material in pan 21 from the selected schedule, but also the polarity of the voltage will shift according to whether the gate 25 or the amount of material in the pan 21 is ahead of or behind the other.

The error signal voltage across the resistor 41 is applied directly to the grid of an amplifying stage 42. Hence, the output of amplifier 42 will vary in polarity according to the polarity of the error signal voltage applied to it across the resistor 41.

A polarity sensitive, amplifying relay circuit is provided comprising a pair of tubes 43 having their anodes connected in push-pull relationship to ground and supplied with A. C. power by a tapped resistor 43c connected across a secondary winding 40c of the transformer 40. Each tube 43 has a relay 43b connected in the plate circuit thereof. Since the center of anode supply winding 40c is effectively grounded through the potentiometer 43c, it is apparent that one or the other of tubes 43, and hence the relays 43b, will be energized according to the polarity of the error signal voltage appearing across resistor 41.

Relays 43b are each provided with normally open contacts 43d which are closed by the energization of the particular relay. The gate drive motor 27 is preferably of the type having a center tapped field winding 27a whose center point is connected directly to one side of the armature of motor 27. The other side of the armature of motor 27 is connected to one side of a source of power, such as the battery 44. The other side of battery 44 is connected directly to one side of contact 43d of both relays 43b. The other sides of contacts 43d of relays 43b are respectively connected to the end terminals of motor field winding 27a.

It is therefore apparent that the direction of energization of gate drive motor 27 is controlled according to the selective energization of the relays 43b. Therefore, the direction of energization of gate drive motor 27 may be controlled in accordance with the polarity of the error signal voltage appearing across resistor 41.

The direction of rotation of gate drive motor 27 in response to the error signal voltage is selected so that the motor 27 drives the movable gate 25 in a direction tending to reduce the error signal voltage to zero. Accordingly, the described apparatus will continually control the gate drive motor 27 to maintain a desired correlation between the position of gate valve 25 and the amount of material on the pan 21 so that such gate will gradually approach its closed position as the material on pan 21 approaches the desired weight value and the gate 25 will be completely closed at the same instant that the material on pan 21 reaches the predetermined desired weight. Hence, the system operates automatically with high precision to load a predetermined weight of material upon pan 21. Obviously, the removal of the material from pan 21 restores the system to its original condition wherein the gate valve 25 is in its wide open position.

Referring now to Figure 4, a modification of this invention is disclosed wherein mechanical movements are utilized to produce the signals which are respectively responsive to the position of the gate and to the instantaneous value of the quantity of material collected on the pan of the measuring device. The arrangement of the hopper 20, the hopper gate or valve 25, the gate driving motor 27 and the balance beam scale 22 is substantially identical to that previously described in connection with the modification of Figure 2. However, the position of the hopper gate 25 is translated into a mechanical movement by virtue of a link 46 which is secured to the gate driving shaft 26 and is movable therewith. The other end of link 46 is pivotally connected to a slide rod 47 which projects into a differential unit 50.

A mechanical signal responsive to the amount of material collected on the pan 21 of the balance beam scale 22 is produced by a link 48 which has one end thereof rigidly secured to the shaft 32c which is connected to the balance beam 22a at the pivot point thereof. The other end of link 48 is pivotally secured to a slide rod 49 which also projects into the differential unit 50.

Differential unit 50 may comprise any one of several well known forms wherein a signal is generated as a function of the differences of the movements of the slide rods 47 and 49. Such error signal generated by the differential unit 50 may comprise another mechanical movement or, if desired, may be directly produced as an electrical signal suitable for operating the gate drive motor 27.

Hence, as shown in Figure 5, differential unit 50 may constitute a contact making arrangement which effects the closure of a pair of contacts whenever unequal movements of the slide rods 47 and 49 occur. Thus a single contact 51 may be mounted on slide rod 49 by a leaf spring 52 while a pair of contacts 53 and 54 are respectively mounted on slide rod 47 by leaf springs 55 and 56. The contacts 53 and 54 are respectively disposed on opposite sides of contact 51 so that whenever unequal movements of slide rods 47 and 49 occur, the contact 51 will engage either the contact 53 or the contact 54 according to whether the rod 47 is moving faster or slower than the rod 49.

It is therefore apparent that a differential control action is thus produced which is responsive to the relative position of the gate 25 with respect to the amount of material on weighing pan 21. The contacts 51, 53 and 54 may be employed to differentially energize gate motor 27 in a manner similar to the connection of the relays 43b heretofore described in connection with the modification of Figure 3, or the control action exerted by such contacts may be applied to an amplifier 57 and the output of such amplifier utilized to differentially drive the gate motor 27 in a direction to return the error signal to a zero value, hence to maintain the contact 51 out of engagement with either of the contacts 53 and 54.

It is therefore apparent that the modification of Figures 4 and 5 also accomplishes automatic batch measuring in accordance with the methods of this invention.

Considering now the modification of Figures 6 and 7, a hopper 60 is provided in cooperative relationship to a weighing pan 61 of a balance beam type scale 62. A horizontally sliding valve or gate 64 is employed to control the flow of material from the hopper 60 to the pan 61, and such gate is in turn positioned by a fluid pressure cylinder 65 as by being connected to the piston 65a thereof by bar 63.

The means for generating a signal proportional to the position of gate 64 in this modification comprises a selsyn generator 66 which is directly driven through gear 67 by a rack portion 63a formed on the gate bar 63. Likewise the pivotal position of the balance beam 62 which, of course, is a function of the amount of material supplied to the measuring pan 61, is translated into an electrical signal by a second selsyn generator 68 which is directly connected to the pivot point of balance beam 62.

As best shown in Figure 7, the selsyn generators 66 and 68 both have their single phase primaries connected to a suitable source of alternating current. The three-phase secondaries of selsyn generators 66 and 68 are respectively connected to the three-phase rotor and stator windings of a differential selsyn motor 69.

It will be apparent to those skilled in the art that so long as equal angular displacements of selsyn generators 66 and 68 are produced by the movements of the gate 64 and the balance beam 62, no effect is exerted upon differential selsyn motor 69. Upon a variation of the relative angular displacements of the rotors of selsyn generators 66 and 68 a flow of current to the differential selsyn motor 69 will result which will shift the rotor of selsyn motor 69 an amount proportional to the differences in angular displacement of selsyn generators 66 and 68, hence the rotational shifting of differential selsyn motor 69 represents the "error signal" of this particular modification.

Such error signal is utilized to control the position of gate 64 through the medium of a double acting fluid valve 70 which controls the supply of fluid to the pressure cylinder 65. The movable valve element 70a of valve 70 is shifted by the rotor of differential motor 69 through the cooperation of a rack 70b with a gear 69a. A conduit 71 from a suitable source of fluid pressure connects with the chamber of valve 70 at a point intermediate the sliding piston portions 70c and 70d. Piston portions 70c and 70d respectively cooperate with conduits 74 and 75 which communicate with the chamber of pressure cylinder unit 65 at points respectively on opposite sides of the piston 65a. Hence, any shifting of the valve pistons produced by rotational displacement of the differential selsyn motor 69 will result in fluid pressure being applied to one or the other sides of the piston 65a and hence result in movement of the gate 64. The direction of such movement is of course selected so as to reduce the error signal to zero, i. e., return the rotor of selsyn motor 69 back to its original position.

It is therefore apparent that the modification of Figures 6 and 7 provides still another apparatus for carrying out the automatic batch measuring methods of this invention.

The three distinct modifications herein described illustrate clearly that the principles of invention are not limited to the utilization of any particular form of signals or any particular apparatus for generating the signals responsive to the position of the gate and the amount of material collected on the pan of the measuring device.

It should be obvious that the correlation of the gate position with the amount of material on the measuring pan need not take place during the entire portion of a weighing cycle, but only throughout a selected fractional portion of each cycle. In the interests of speed of measurement, the servo mechanism effecting the correlation is preferably not utilized during the entire weighing operation, but is brought into action during the latter part of the cycle. Thus, if a pound weight is being batched, the supply gate may be left full open until the scale weight reaches approximately 7/8 pound, and then the last 1/8 of a pound weighed out under the servo mechanism control. It is readily seen that with such an arrangement the length of time required for each measuring cycle is substantially minimized without adversely affecting the accuracy of the measuring operation.

It will, of course, be understood that various details of construction or operation may be modified through a wide range without departing from the principles of this invention, and it is, therefore, not the purpose to limit the patent granted hereon otherwise than necessitated by the scope of the appended claims.

We claim as our invention:

1. Apparatus for automatic measuring of successive quantities of flowable material comprising a measuring device having a material receiving pan and an element movable as a function of the quantity of the material on said pan, a supply conduit cooperating with said pan to supply material thereto, a shiftable valve in said conduit arranged to have a predetermined position for each position of said movable element in order to control the rate of material flow through said conduit, a first signal generating device connected to said movable element to produce a first signal which is a function of the position of said movable element, a second signal generating device connected to said valve to produce a second signal which is a function of the position of said valve, and means for comparing said first and second signals to produce an error signal whenever said first and second signals depart from the predetermined position relation between said valve and movable element, and means for shifting said valve as a function of said error signal and in the direction to reduce said error signal to zero.

2. Apparatus for automatic measuring of a predetermined quantity of flowable material comprising a measuring device having a material receiving pan and an element movable as a function of the quantity of material on said pan, a supply conduit cooperating with said pan to supply material thereto, a shiftable valve in said conduit arranged to have a predetermined position for each position of said movable element thereby to control the rate of material flow to said pan, a first electrical generating device connected to said movable element and constructed and arranged to produce a first voltage which is a function of the position of said element, a second electrical generating device connected to said valve and constructed and arranged to produce a second voltage which is a function of the position of said valve, and means for comparing said first and second voltages to produce an error voltage whenever said first and second voltages depart from the predetermined position relation between said valve and movable element, and means for shifting said valve as a function of said error voltage and in a direction to reduce said error voltage to zero, whereby said valve can be made to completely close when a predetermined quantity of material is deposited on said pan.

3. Apparatus for automatic measuring of successive quantities of flowable material comprising a measuring device having a material receiving pan and an element movable as a function of the quantity of material on said pan, a supply conduit cooperating with said pan to supply material thereto, a shiftable valve in said conduit arranged to have a predetermined position for each position of said movable element thereby to control the rate of material flow through said conduit, a fluid pressure cylinder for shifting said valve, a first signal generating device connected to said movable element to produce a first signal which is a function of the position of said movable element, a second signal generating device connected to said valve to produce a second signal which is a function of the position of said valve, means for comparing said first and second signals to produce an error signal whenever said first and second signals depart from the predetermined position relation between said valve and movable element, a shiftable, double acting fluid supply valve connected to said pressure cylinder, and means for shifting said fluid supply valve as a function of said error signal to actuate said pressure cylinder in a direction to reduce said error signal to zero, whereby said valve will maintain the predetermined relation between said valve and movable element.

4. Apparatus for automatic measuring of successive quantities of flowable material comprising a measuring device having a material receiving pan and an element movable as a function of a quantity of material on said pan, a supply conduit cooperating with said pan to supply material thereto, a shiftable valve in said conduit arranged to have a predetermined position for each position of said movable element thereby to control the rate of material flow through said conduit, a fluid pressure cylinder for shifting said valve, a first selsyn generator having its rotor movable with said valve, a second selsyn generator having its rotor movable with said movable element, a differential selsyn motor electrically connected between said first and second selsyn generators, thereby producing an error movement of the rotor of said motor as a function of the relative movement of said material flow valve and said movable element, and a double acting, fluid supply valve controlled by said motor rotor to actuate said pressure cylinder in a direction to reduce said error movement to zero.

5. Apparatus for automatic measuring of predetermined lots of flowable material comprising a measuring device having a material receiving pan and an element movable as a function of the quantity of material on said pan, means for supplying material to said pan, a shiftable valve construction in the path of flow of said material arranged to have a predetermined position for each position of said movable element thereby to control the rate of material flow to said pan, a first movable switch contact, means for moving said first contact proportionately with said movable element, a second switch contact movable along the same path as said first switch contact, means for moving said second contact proportionately with said valve, whereby said first and second contacts are engaged by relative movements of said movable element and said valve, an electric motor for shifting said valve, and means for energizing said motor in response to engagement of said contacts to shift said valve in a direction to disengage said contacts.

6. The method of measuring a predetermined quantity of flowable material which comprises feeding the material in a flowing stream to a point of measuring, measuring the quantity fed to such point as flow continues, generating a first signal as an instantaneous function of the quantity of material being measured, generating a second signal of similar characteristics to said first signal as a function of the rate of feed flow of said material, varying the rate of feed flow of said material in accordance with a predetermined sequence of rate change for the quantity being measured, establishing a predetermined signal relation corresponding to the predetermined rate-quantity relation, comparing said signals and producing an error signal whenever the relation between said first and second signals varies from said predetermined signal relation, and varying said rate of flow of material as a function of said error signal in such manner as to reduce said error signal to zero, whereby said rate of feed flow is continuously maintained in predetermined relation to the quantity measured.

7. The method of measuring a predetermined quantity of flowable material which comprises feeding material in a flowing stream to a point of measuring, measuring the quantity fed to such point as flow continues; generating a first signal as an instantaneous function of material being measured, generating a second signal of similar characteristics to said first signal as a function of the rate of feed flow of said material, reducing the rate of feed flow in a predetermined manner in response to signals corresponding to increasing quantities being measured until said flow ceases when a signal corresponding to a predetermined quantity is generated, continuously comparing said signals and producing an error signal whenever said first and second signals vary from those corresponding to the predetermined rate quantity relation, and varying said rate of flow of material as a function of said error signal in such manner as to reduce said error signal to zero, whereby said rate of feed flow is continuously maintained in predetermined relation to the quantity measured.

8. The method of measuring a predetermined quantity of flowable material which comprises feeding the material in a flowing stream to a point of measuring, measuring the quantity fed to such point as flow continues, producing a first signal as an instantaneous function of the quantity of material being measured, producing a second signal of similar characteristics to said first signal as a function of the rate of feed flow of said material, varying the rate of feed flow of said material in accordance with a predetermined relation to said first signal, stopping said feed flow of material when the signal corresponding to a predetermined quantity of material being measured is produced, regulating said feed flow in accordance with said predetermined relation to said first signal by continuously comparing said second signal to said first signal.

9. Apparatus for the automatic measuring of successive quantities of flowable material comprising a measuring device having a material receiving receptacle and an element movable as a function of a quantity of material on said receptacle, a supply container cooperating with said receptacle to supply material thereto, a shiftable valve arranged to have a predetermined posiiton for each position of said movable element thereby to control the rate of material flow through said container, means for shifting said valve, a first selsyn generator having its rotor movable with said valve, a second selsyn generator having its rotor movable with said movable element, a differential selsyn motor connected to said first and second selsyn generators, thereby producing an error movement of the rotor of said motor as a function of the relative movement of said material flow valve and said movable element, and means controlled by the rotor of said differential motor for operating said valve shifting means to shift the valve in the direction to reduce said error movement.

10. Apparatus for automatically controlling the delivery of a predetermined quantity of flowable material to a container comprising a measuring device for operative association with a container and having means giving a response varying as a function of the amount of material in an associated container, means for delivering material to an associated container, means variable to give varying rates of change of the quantity of material in an associated container and arranged to give a predetermined rate of change for each response of said measuring device response means, a first signal generating device operatively associated with said measuring instrument response means to produce a first signal which is a function of the response of said response means, a second signal generating device operatively associated with said variable means to produce a second signal which is a function of the rate of change given by the variable means, and means for comparing said first and second signals to produce an error signal when said first and second signals depart from the predetermined rate of change-response relation between said variable means and said response means, and means for varying said variable means as a function of said error signal and in the direction to reduce said error signal.

11. Apparatus for automatically controlling the delivery of a predetermined quantity of flowable material to a container, comprising a measuring device for operative association with a container and having an element movable as a function of the quantity of material in an associated container, a supply for cooperating with an associated container to supply material thereto, a gate for controlling flow of material from said supply and arranged to have a predetermined position for each position of said movable element, the gate being arranged to reach shut position at least by the time the movable element has reached a position corresponding to the predetermined amount of flowable material being in an associated container in order to deliver to container only the predetermined amount, a first signal generating device connected to said movable element to produce a first signal which is a function of the position of said movable element, a second signal generating device connected to said gate to produce a second signal which is a function of the position of said gate, and means for comparing said first and second signals to produce an error signal whenever said first and second signals depart from the predetermined position relation between said gate and movable element and means for shifting said gate as a function of said error signal and in the direction to reduce said error signal to zero.

12. Apparatus for automatic measuring of successive batches of granular material comprising a scale of the beam-balance-type, means associated with said beam for supporting the material to be weighed, means for introducing on said scale beam a predetermined counterbalance corresponding to the batch to be measured, a supply conduit for delivering material to said support means, a shiftable valve in said conduit arranged to have a predetermined position for each position of said scale beam in order to control the rate of material flow through said conduit, a first signal generating device connected with said scale beam to produce a first signal which is a function of the position of said scale beam, a second signal generator device connected to said valve to produce a second signal which is a function of the position of said valve, and means for comparing said first and second signals to produce an error signal whenever said first and second signals depart from the predetermined position relation between said valve and said scale beam, and means for shifting said valve as a function of said error signal and in the direction to reduce said error signal to zero.

MARTIN GOLAND.
PRICE D. WICKERSHAM.

References Cited in the file of this patent

UNITED STATES PATENTS

| Number | Name | Date |
| --- | --- | --- |
| 618,384 | Richards | Jan. 24, 1899 |
| 1,001,562 | Smith | Aug. 22, 1911 |
| 1,962,677 | Dickey | June 12, 1934 |
| 2,040,729 | De Cissey | May 12, 1936 |
| 2,067,645 | Pinkerton | Jan. 12, 1937 |
| 2,161,960 | Hintze | June 13, 1939 |
| 2,263,055 | Smith, Jr. | Nov. 18, 1941 |
| 2,305,484 | Merchen | Dec. 15, 1942 |
| 2,489,899 | Kniazuk | Nov. 29, 1949 |
| 2,509,629 | De Giers | May 30, 1950 |
| 2,544,155 | Herkenrider | Mar. 6, 1951 |
| 2,597,831 | Willis | May 20, 1952 |

FOREIGN PATENTS

| Number | Country | Date |
| --- | --- | --- |
| 362,702 | Great Britain | Dec. 10, 1931 |